United States Patent [19]

Jensen

[11] Patent Number: 5,321,327
[45] Date of Patent: Jun. 14, 1994

[54] ELECTRIC GENERATOR WITH PLASMA BALL

[75] Inventor: Donald C. Jensen, West Palm Beach, Fla.

[73] Assignee: 21st Century Power & Light Corporation, Lantana, Fla.

[21] Appl. No.: 828,194

[22] Filed: Jan. 30, 1992

[51] Int. Cl.⁵ ............................ G21D 7/02; G21G 1/00
[52] U.S. Cl. .......................................... 310/11; 310/10; 310/308; 376/107; 376/150
[58] Field of Search ............................ 310/10, 11, 308; 376/107, 195, 149, 150; 315/111.71

[56] References Cited

U.S. PATENT DOCUMENTS

| | | |
|---|---|---|
| 871,070 | 11/1907 | Schwartz . |
| 3,626,218 | 12/1971 | Shriver ..................... 310/11 |
| 3,942,939 | 3/1976 | Matsumura et al. ............... 431/215 |
| 3,982,392 | 9/1976 | Crow ..................... 60/39.65 |
| 4,087,234 | 5/1978 | Delyannis ..................... 431/168 |
| 4,154,567 | 5/1979 | Danmen ..................... 431/5 |
| 4,653,541 | 7/1987 | David ..................... 364/500 |
| 4,691,130 | 9/1987 | Gillison ..................... 310/11 |
| 4,851,722 | 7/1989 | Zauderer ..................... 310/11 |
| 5,026,681 | 6/1991 | Hed ..................... 310/11 X |
| 5,160,694 | 11/1992 | Steudtner ..................... 376/107 |

FOREIGN PATENT DOCUMENTS

2158852 8/1972 Fed. Rep. of Germany .
2857182 9/1978 Fed. Rep. of Germany .
1066155 6/1954 France .
853290 8/1981 U.S.S.R. .

Primary Examiner—Peter A. Nelson
Attorney, Agent, or Firm—Oltman and Flynn

[57] ABSTRACT

An electric generator using imploding plasma dynamics for generating electric energy from fuel energy, which includes a substantially cylindrical vortex chamber bounded by a cylindrical chamber wall having an axis, an inward curved fuel inlet end wall, and an opposite inward curved exhaust end wall; a shroud surrounding the vortex chamber forming an air space between the chamber wall and the shroud; at least one air inlet entering the air space at an angle tangential to the air space; air compressor means fluidly communicating with the air inlet for injecting air into the air space; fuel-air mixture injection means disposed in the fuel inlet end wall; a mixing chamber in the fuel-air mixture injection means for mixing fuel with the air fluidly communicatng with the air space; a plasma expansion cone having an inlet fluidly communicating with the mixing chamber for receiving fuel-air mixture from the mixing chamber; ignition means in the plasma expansion cone for igniting the fuel-air mixture, and forming at least one imploding plasma vortex in the vortex chamber; and electric energy take-off means connected with the vortex chamber for taking off electric energy generated by the imploding plasma vortex.

9 Claims, 8 Drawing Sheets

ELECTRIC GENERATOR WITH PLASMA BALL

The invention relates to an electric generator employing a plasma ball as an electric power generating medium, and more particularly employing a plasma bell of highly heated gas turning at a high speed of rotation in a vortex chamber.

BACKGROUND OF PRIOR ART

The use of a fast moving mass of gas plasma for the purpose of generating electric power is known from magneto hydrodynamic technology. In the known technology of hydrodynamics a gas plasma of high-temperature ionized gas is driven at high velocity through a magnetic field so that an electromotive force is generated by the moving gas plasma and tapped off at electrodes in the plasma.

The technology of magneto hydrodynamics has never been developed to the point wherein it has become commerically successful, due to the fact that the gas plasma exiting the magnetic field still contains a considerable amount of thermal energy that is not converted into electric power.

The instant invention overcomes this drawback by means of a different approach to converting the hot gas plasma to electric energy, which utilizes a principle of a vortex formed in the gas plasma, and more particularly a principle of so-called imploding plasma vortex dynamics in the following disclosure termed "Imploding Plasma Dynamics", wherein the plasma is in continuous contact with the electrodes until they have released the major part of its kinetic energey,

SUMMARY OF THE INVENTION

A sustained implosion of highly heated, high velocity rotating imploding vortices of a gas plasma containing fuel and air mixture is created within an ionizing chamber prior to combustion of the imploding vortices. The system is arranged to maximize formation of laminar flow so as to stratify all molecular and atomic particles by particle mass. The laminar flow patterns operate to trap the heavier gas masses in very hot pressure areas so that they release the kinetic energy of their mass in the form of electric energy before they escape from the vortices followed by a return of lighter gases to a vacuum formed in a central core of the vortices in a continuously repeated cycle. The combustion in the plasma produces great quantities of free electrons that associate with and exchange energy with the highly heated stratified gas particles so as to produce an electrical potential due to the stratification of heavier masses and lighter masses of molecular and electron gases containing the large quantities of electrons and ions. Cooperating vortex and ionizing fuel chambers are arranged in a way so as to use these chambers as electrodes for supplying an electric current by the principle of imploding plasma dynamics.

The apparatus for producing electrical energy according to the invention operates by combusting fuel in sustained rotating imploding vortices. It was discovered by the applicant that when such a system was properly understood and utilized, it provided a novel method of liberating electrical energy from different forms of gaseous liquid, powdery and solid fuels. this invention further includes a technology wherein the fuel is super preheated so as to make it chemically and molecularly very active and to enclose this preheated fuel into an electrically insulated ionizing chamber, containing large numbers of free electrons. Actual prototype tests have indicated that these electrons appear to attach themselves to the fuel molecules, causing the fuel molecules to become activated and to behave as a plasma within the vortex chamber. The plasma thus activated greatly increases the combustion temperature which further enhances formation of the plasma. Diesel oil that normally burns at 1200° F. in a prototype system has shown a combustion temperature in excess of 2400° TM F. The flow patterns within this system operate to create the sustained implosion within the vortex chamber.

The imploding vortex is a stratified system wherein the heavier particles of the gas masses become progressively stratified with the outer perimeter of the vortex and the lighter particles of the gas masses become progressively stratified around a central core due to the gravity gradient formed in the vortices. A greater pressure is formed along the outer perimeter and a lighter pressure or vacuum is formed along the central axis. It can also be demonstrated that the center of a high velocity combustion vortex is cool when compared with the temperature of its outer periphery. The disclosed invention utilizes all of the important characteristics of the imploding vortex so as to increase the energy conversion efficiency and to greatly reduce the pollutants commonly associated with combustion of hydrocarbon and other fuels.

The invention as disclosed herein is believed to be a novel way of generating electricity in an efficient and nonpolluting manner.

The disclosed invention utilizes the principle of imploding plasma dynamics such that in one embodiment, two counter rotating, imploding plasma vortices facing each other produce a magnetic field and release free, fast-moving electrons that produce a polarized electron gas that is in electrical contact with two insulated halves of the outer walls of the combustion chamber. The two halves are electrically insulated so as to form plus (+) and minus (−) electrodes giving the electrons conducting path so that they can be utilized for generating electrical energy.

It is known that when too many free electrons exist within a system, the system will increase in temperature, and that the reverse is also true—i.e., if free electrons are drained from the system, it will reduce its temperature. In operation, the plasma ball will produce prodigious quantities of free, fast-moving electrons in a controlled and confined space, producing intensive heat that may exceed safe limits of its construction materials. Accordingly, cooling of the plasma ball is attained by draining surplus electrons from the system by always having a work load on the system.

In accordance with the invention there is provided an electric generator using imploding plasma dynamics for generating electric energy from fuel energy, which includes a substantially cylindrical vortex chamber bounded by a cylindrical chamber wall having an axis, an inward curved fuel inlet end wall, and an opposite inward curved exhaust end wall; a shroud surrounding the vortex chamber forming an air space between the chamber wall and the shroud; at least one air inlet entering the air space at an angle tangential to the air space; air compressor means fluidly communicating with the air inlet for injecting air into the air space; fuel-air mixture injection means disposed in the fuel inlet end wall; a mixing chamber in the fuel-air mixture injection means for mixing fuel with the air fluidly communicating with the air space; a plasma expansion cone or other vortex forming means having an inlet fluidly communicating with the mixing chamber for receiving fuel-air mixture from the mixing chamber; ignition means in the plasma expansion cone for igniting the fuel-air mixture, and forming at least one imploding plasma vortex in the vortex chamber; and electric energy take-off means connected with the vortex chamber for taking off electric energy generated by the imploding plasma vortex.

In accordance with a further feature, the electric generator may include magnetic field forming means for forming a radially extending magnetic field in the vortex chamber, the radially extending magnetic field cooperating with the imploding plasma vortex for generating an electromotive force in the vortex chamber connected with the electric energy take-off means, at least one permanent magnet in the magnetic field forming means, or at least one electromagnet in the magnetic field forming means.

The electric generator may further include an outer cylindrical magnet and an inner conical magnet in the magnetic field forming means, the inner and outer magnets coaxially disposed with the axis of the vortex chamber, en exhaust tube fluidly communicating with the vortex chamber for releasing exhaust gas from the vortex chamber, and an exhaust gas inlet in the exhaust gas tube, the exhaust gas inlet disposed in the axis of the vortex chamber.

The exhaust tube is advantageously disposed coaxially with the axis of the vortex chamber.

According to another feature, the electric generator includes a heat protective also advantageously electrically conductive lining in the vortex chamber.

According to still another feature, the electric generator includes a fuel line in the fuel-air mixture injection means connected to a source of liquid fuel, or to a source of gaseous fuel, and further liquid fuel vaporizing means for vaporizing the liquid fuel, connected to the fuel line.

There may additionally be included a mixing chamber in the fuel-air mixture injection means, and a fuel injector connected to the fuel line for injecting fuel into the mixing chamber, and an ignitor in the ignition means, and a spark generator connected to the ignitor for igniting the fuel-air mixture.

The electric generator according to the invention may advantageously include a plurality of exhaust reentry vanes in the plasma expansion cone and/or the premixing chamber for reentry of exhaust gas from the vortex chamber into the plasma expansion cone.

The exhaust tube can be a metallic tube, and an electric insulator which insulatingly connects the exhaust tube with the vortex chamber.

The electric generator according to the invention includes a first electric terminal in the electric energy take-off means, attached to the exhaust tube, a second electric terminal in the electric energy take-off means connected to the vortex chamber wall, and an electric voltage converter connected to the first and second terminal for converting the voltage of the electric energy to user-adjusted electric voltages.

Another embodiment of the electric generator using imploding plasma dynamics for generating electric energy from fuel energy, includes:

(a) two facing hemispheric vortex chambers having a common axis;

(b) an insulator separating the vortex chambers, disposed in a plane perpendicular to the common axis;

(c) two facing hemispheric shrouds each enclosing a respective one of the hemispheric vortex chambers, and forming respective air spaces with the vortex chambers;

(d) two oppositely oriented air inlets for injecting air in opposite directions into the air spaces;

(e) air compressor means fluidly communicating with the air inlets for injecting air into the air inlets;

(f) respective fuel-air mixture injection means in the hemispheric vortex chambers, each fuel-air mixture injection means including a mixing chamber in fluid communication with a respective air space, a plasma expansion cone or other vortex-forming means fluidly communicating with a respective mixing chamber, ignition means in the plasma expansion cones for igniting the fuel-air mixture, and forming oppositely rotating imploding plasma vortices in the vortex chambers; and (g) electric energy take-off means for taking off electric energy generated by the oppositely rotating imploding plasma vortices.

The electric generator according to the invention includes fuel preheating means having a preheated fuel outlet in fluid communication with the fuel line, and a fuel inlet for receiving liquid and/or gaseous fuel.

The fuel preheating means may include the heat exchanger, a heating element, an electric power source connected to the heating element for electrically heating the heating element, and a fuel channel in the heating element for circulating fuel to be heated in the channel, the channel having a heated fuel outlet in fluid communication with the preheated fuel outlet, and wherein further the heating element is a coiled tube.

The fuel-preheating means may include an electrolyzing electrode in the heat exchanger for electrolyzing the heated fuel, and an electrolyzing power source connected to the electrolyzing electrode for electrolyzing the heated fuel.

Further objects and advantages of this invention will be apparent from the following detailed description of a presently preferred embodiment which is illustrated schematically in the accompanying drawings.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

DESCRIPTION OF THE PREFERRED EMBODIMENT

Figure 1:
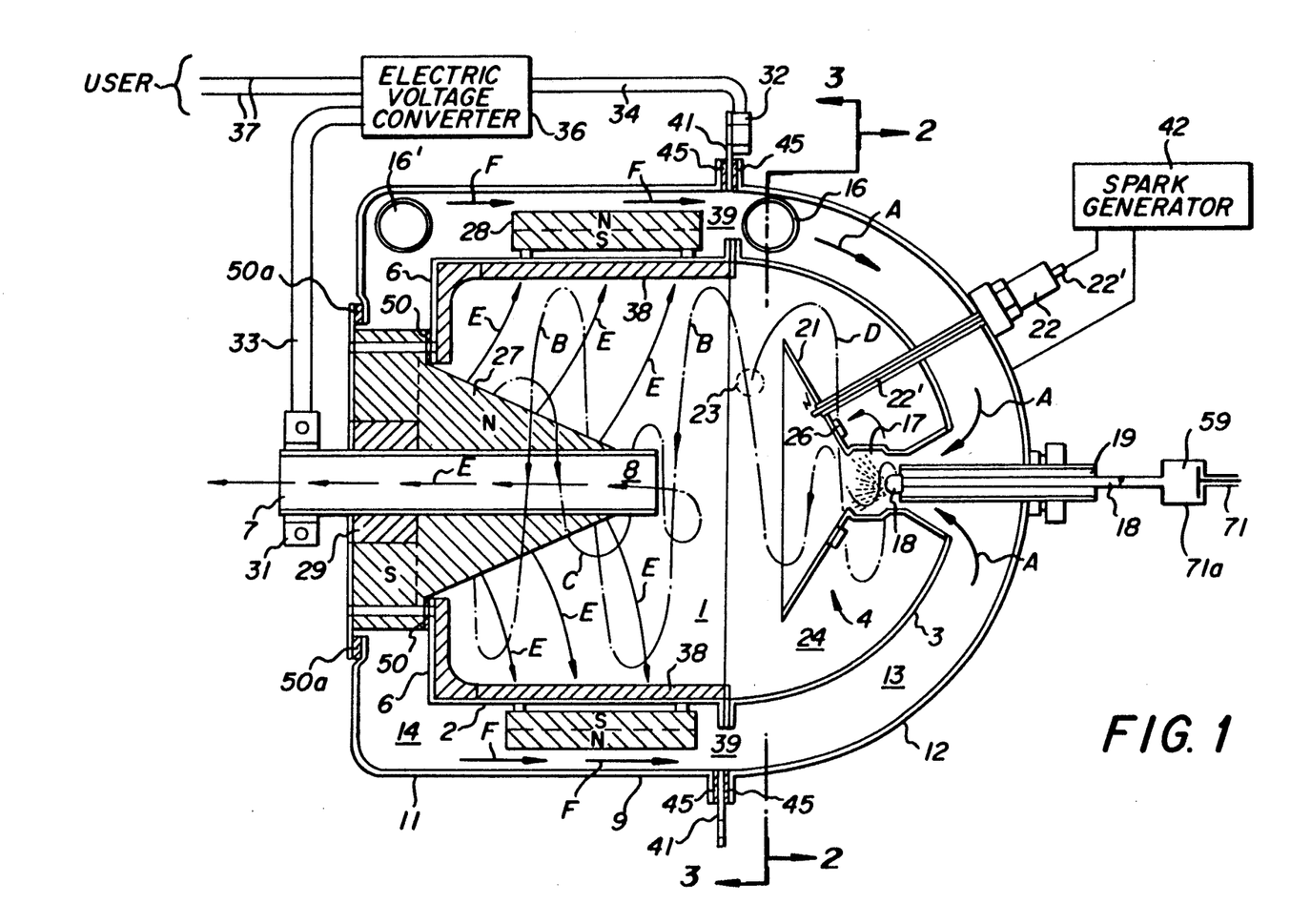
FIG. 1 is an elevational diagrammatic cross-sectional view of the invention showing its major elements, and air flow.
Figure 2:
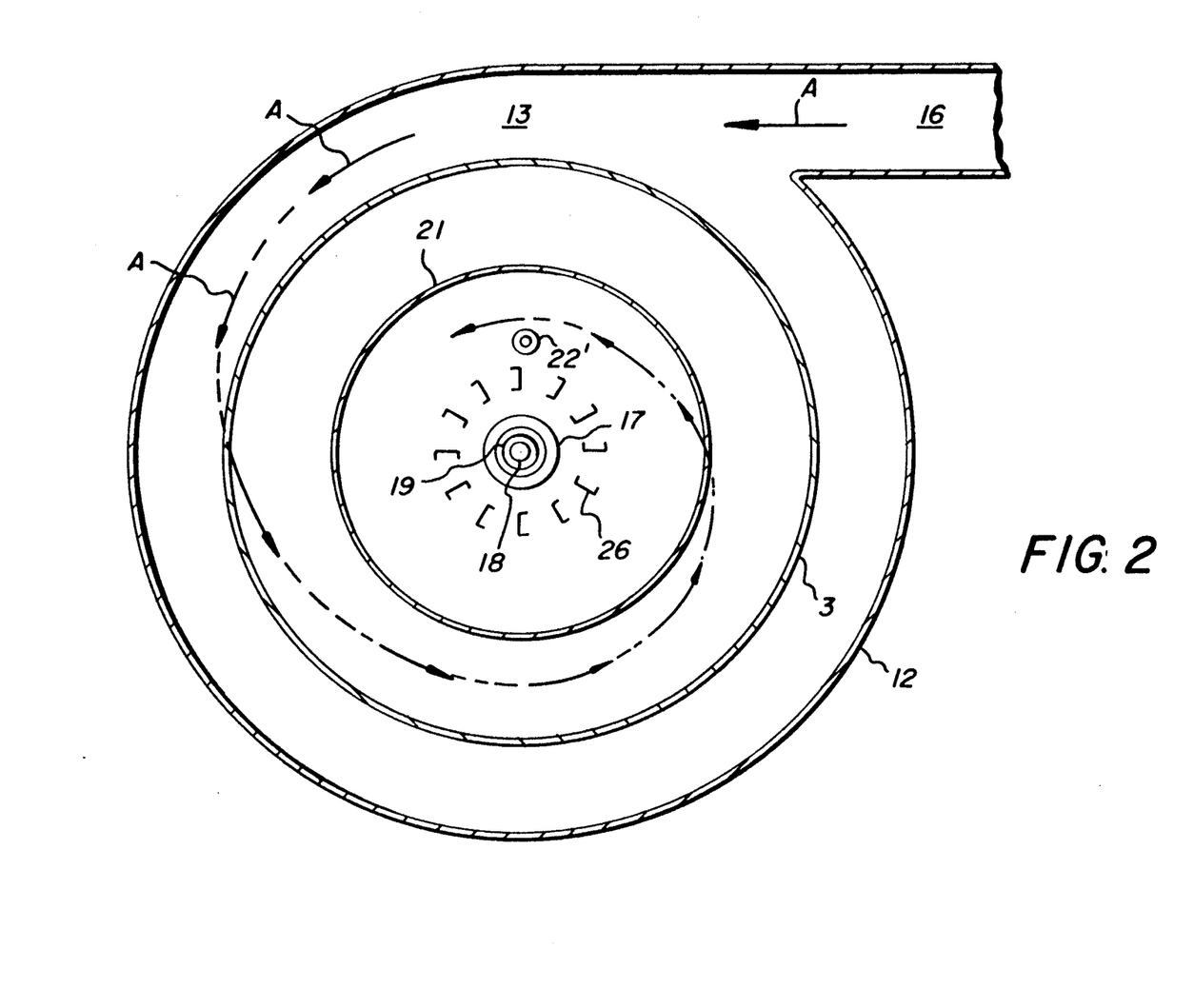
FIG. 2 is an elevational diagrammatic cross-sectional view of the invention seen along the line 2—2 of FIG. 1 to show the interior construction.
Figure 3:
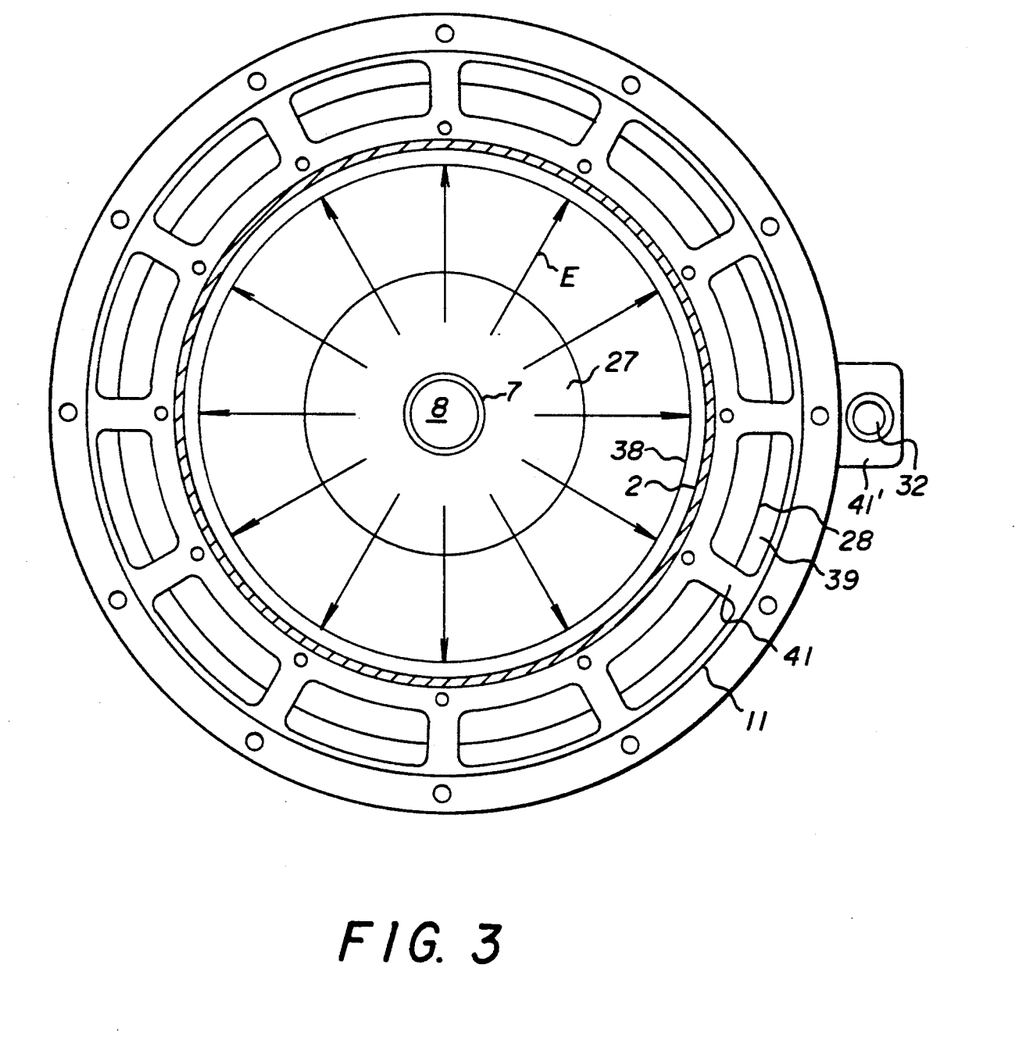
FIG. 3 is an elevational diagrammatic cross-sectional view of the invention seen along the line 3—3 of FIG. 1 to show the interior construction.

In FIGS. 1, 2 and 3 a vortex chamber 1 is formed of a circular, substantially cylindrical wall 2, a hemispheric inward curved fuel inlet end wall 3 and a fuel-air injection arrangement 4 within the hemispheric fuel end wall 3, and an opposite circular exhaust end wall 6 which is also substantially inward curved and has a centrally located exhaust tube 7 with an exhaust inlet 8 located in the central axis of the vortex chamber 1. A shroud 9 composed of a cylindrical part 11 and a hemispheric part 12 encloses the vortex chamber 1, forming between the vortex chamber walls and the shroud 9 an air space composed of a circular hemispheric part 13 and a cylindrical part 14. The air space 13 has an air inlet 16 connected to a compressed air source (not shown) which injects air tangentially into the air space 13, wherein the air is preheated by contact with the hemispheric wall 3 and spirals along a spiral line indicated by arrows A, as also seen in FIG. 2, into a mixing chamber 17, wherein the preheated air is mixed with fuel entering a fuel line 18 and is finely dispersed from a fuel injector nozzle 18.

It follows that the injected fuel can be liquid fuel under pressure so that it is finely dispersed, or can be in gaseous or vapor form, or can even, with a suitably adapted injector nozzle 19, be injected as a fine solid fuel dust or powder. A tube 19 can serve to inject a sodium or potassium compound which, if necessary, serves to enhance the ionization of the combustion gases to make them better conductors for electric current as described in more detail below.

From the mixing chamber 17 the fuel-air mixture enters a plasma expansion cone 21 wherein the fuel-air mixture is ignited by a spark ignitor 22, and expands rapidly as it burns, and forms an outer vortex as indicated by arrows B, and wherein the hot swirling still expanding gases move in a spiral along the inside of wall 2 of the cylindrical part of the vortex chamber 1 toward the opposite end wall 6, from where the expanding gases are turned inward into an inner vortex indicated by arrow C. The two vortices together form an imploding plasma vortex wherein the gases in the outer circular strata are under high pressure and at high temperatures, while the gases in the inner strata are under lower pressure, even under certain circumstances below atmospheric pressure, and at lower temperatures, but are rotating at very high velocity compared with the plasma in the outer strata.

The high rotational velocities in the imploding vortex creates a gravitational gradient in the vortex which, combined with the frictional forces between the strata moving at different velocities cause a separation of the lighter and heavier particles of the plasma, with the heavier particles drifting to the perimeter and the lighter particles to the center. Since the heavier and lighter particles have opposite electrical polarities, the outer wall 6 of the vortex chamber 1 becomes charged to one polarity and the inner structure of the vortex chamber become charged to the opposite polarity. These charges are taken off by means of suitable connected electrodes and voltage converter as described in more detail below.

As described above, the particles of the hot plasma rotate in the same direction in the outer and inner strata but are moving axially in opposite directions as shown by arrows B and C in FIG. 1. Part of the hot plasma leaving the expansion cone 21 separates from the main flow at a region 23, indicated by a dashed line circle (FIG. 1) with part of the plasma following arrow D to enter the part 24 of the vortex chamber 1 bounded by the hemispheric end wall 3, wherein the separating plasma forms a secondary imploding vortex, which re-enters the plasma expansion cone 21 via slanted vanes 26 projecting inward or rearward from the expansion cone 21 so as to "catch" part of the plasma of the secondary imploding vortex. The plasma of the secondary vortex re-enters the main vortex, indicated by arrows B and C and insures a high degree of combustion of all parts of the plasma which further insures that the exhaust gases exiting via exhaust tube 7 as indicated by arrows E are almost completely broken down into their basic constituents, composed essentially of nitrogen, carbon dioxide and water vapors.

A test analysis of exhaust gases from a supportive prototype using combusted diesel fuel has shown readings of carbon monoxide (CO) of 75 ppm, carbon dioxide (CO2) of 23.5 ppm, sulphur dioxide (SO2) of 0.02 ppm, general hydrocarbons (CHx) of 0.12 ppm, and the remainder of nitrogen (2) and water vapor (H2O)

The central structures of the vortex chamber 1 include the above described exhaust tube 8 and magnetic elements that produce a radially extending magnetic field in the cylindrical part of the vortex chamber 1, indicated by arrows E which extend from a conical central magnet 27 and a circular ring shaped peripheral magnet structure 28.

The central magnet 27 is an inward tapering conical or cylindrical magnet supported in a circular electrically insulating ceramic body 29 so that it is electrically insulated from the metallic walls of the vortex chamber 1 and the shroud 9. The magnetic elements 27,28 may be permanent magnets or electromagnets and are polarized such that the magnetic field extends radially for example from conical magnet 27 to peripheral magnet 28. The rotation of the ionized plasma in the vortex chamber 1 causes an electromotive force to be formed between the central structures, i.e. the exhaust tube 7, the conical magnet 27 and the peripheral structures, i.e. the cylindrical wall 2 of the vortex chamber. This electromotive force reinforces the electromotive force created by the separation of the electrically charged particles of the rotating gas plasma, described above. The two electromotive forces bridge the gap between the central structures and the peripheral structures of the vortex chamber 1 and can be tapped off at terminal 31 connected to the central exhaust tube 7 and terminal 32 metallically connected via connector 41 to the wall 2 of the vortex chamber 1.

Circular electric insulators 45 are placed on each side of connector 41 to insulate it from cylindrical wall 11 and the hemispheric wall 12 of the shroud 9. Similarly, respective circular electric insulators 50 and 50a are placed between the exhaust end wall 6 and the magnetic structures 27 and between magnetic structures 27 and shroud 11 to prevent electric charges on the central magnetic structures from being short-circuited to the end wall 6 and shroud 11.

Terminals 31, 32 are connected via conductors 33, 34 to an electric voltage converter 36 that converts the electrical energy tapped off at terminals 31, 32 to a voltage at output leads 37 that is suitable for external use.

A heat protective lining 38 of a heat resistant material such as high temperature alloy or graphite or the like is applied to the inside surface of the vortex chamber wall 2.

A second air inlet 16' is, like inlet 16, connected to an external source of compressed air which is similarly injected tangentially into the air space 14 where it spirals in direction indicated by arrows F to join the air injected at air inlet 16, while it is preheated by contact with the hot vortex chamber wall 2 and at the same time helps to cool the outer surface of the cylindrical wall 2 and the ring-shaped magnet 28.

FIG. 2 shows the interior of the electric generator seen along the line 2—2 of FIG. 1, wherein compressed air enters at air inlet 16 and spirals toward the center as shown by arrows A until it enters the mixing chamber 17 as described above, and from there enters the plasma expansion cone 21.

The radially extending slanted vanes 26 are also seen in FIG. 2.

FIG. 3 shows the interior of the electric generator seen along the line 3—3 of FIG. 1, wherein the exhaust tube 7 with inlet 8 is seen in the center, surrounded by the conical magnet 27. The magnetic lines of force indicated by arrows E are shown radiating from conical magnet 27 to the ring shaped magnet 28, seen through air openings 39, formed in a circular metal plate 41 also seen in FIG. 1, which in axial direction separates the cylindrical wall 2 and the hemispheric end wall 3 of the vortex chamber 1, and radially serves to separate the walls of the shroud 9 from the walls of the vortex chamber 1. The circular metal plate 41 has an extension 41' which serves as an attachment point for electric terminal 32, also seen in FIG. 1.

The spark igniter 22 (FIG. 1) has an insulated center electrode 22' that at one end reaches inside the plasma expansion cone 21 and is at the other end connected to an electric spark generator 42 which starts and/or maintains ignition of the fuel-air mixture entering the plasma expansion cone 21.

Figure 4:
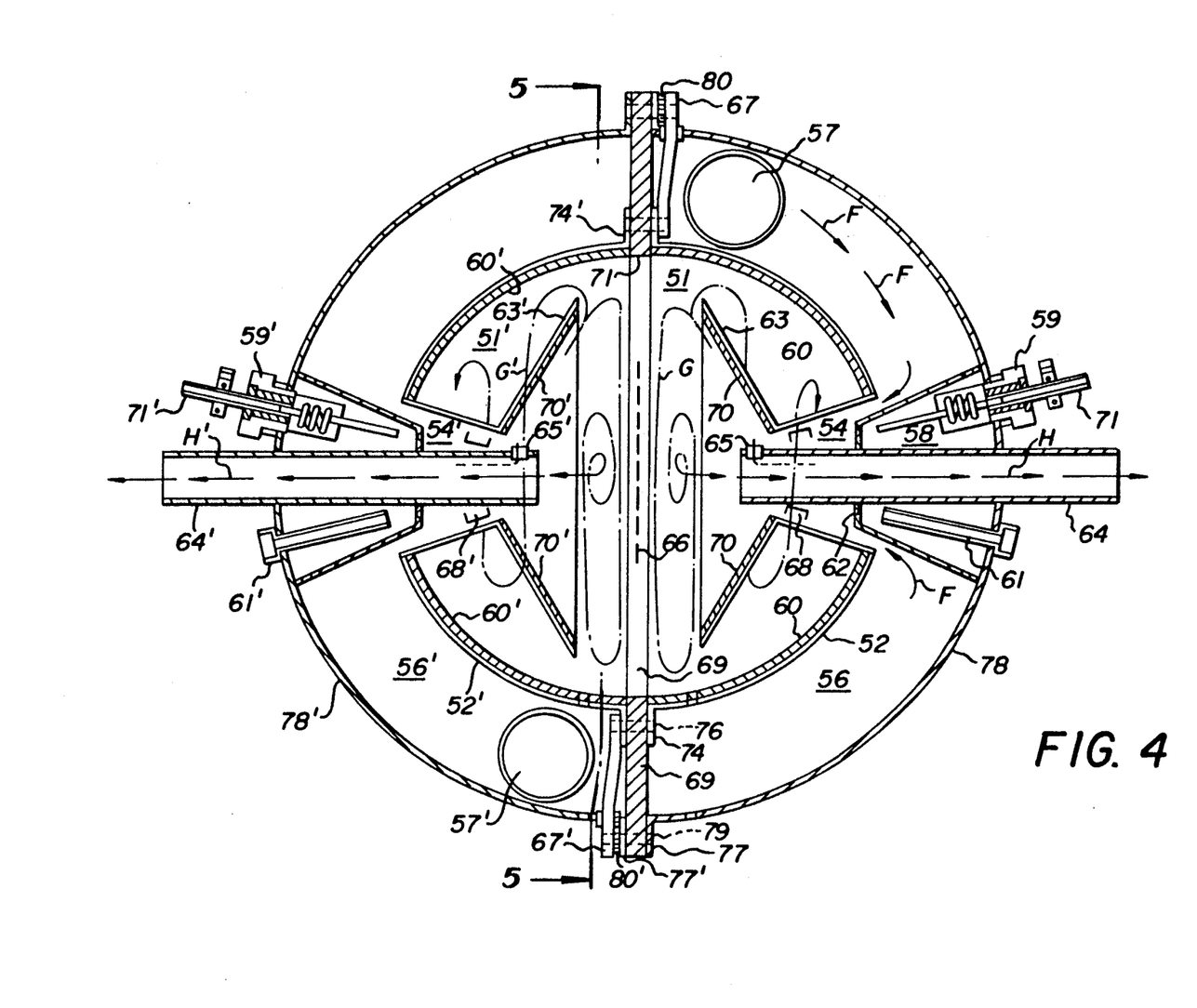
FIG. 4 is an elevational diagrammatic view of the invention showing an embodiment with two vortex chambers.
Figure 5:
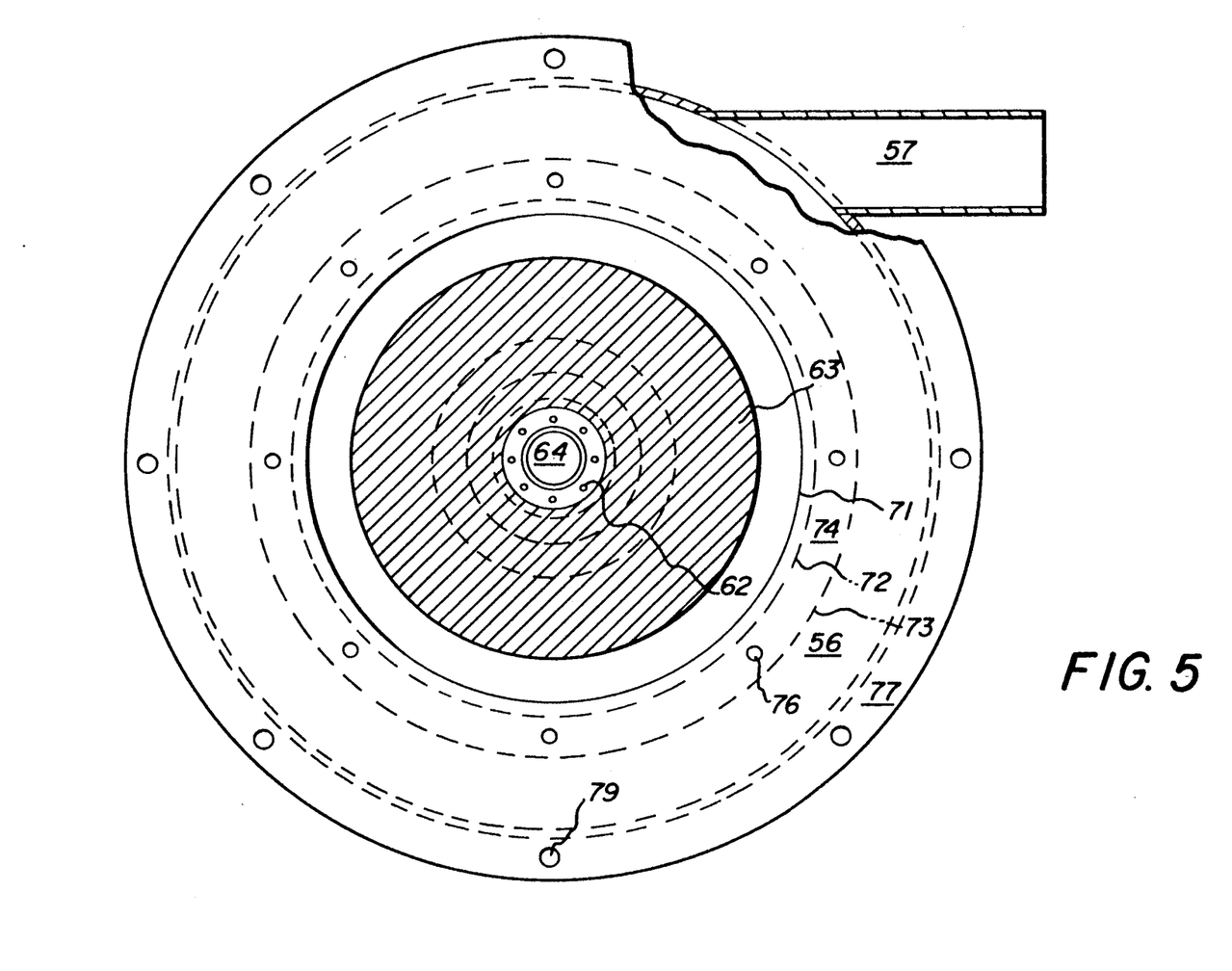
FIG. 5 is an elevational diagrammatic cross-sectional view of the invention seen along the line 5—5 of FIG. 4.

FIGS. 4 and 5 show an embodiment of the invention having a spherical vortex chamber 51 divided symmetrically into two chamber parts 51 and 51'. Since this embodiment is symmetrical about a symmetry plane 66, except for the second air inlet 57', the following description relates to the right hand part, while the symmetrical left hand part has elements shown with primed reference numerals. A hemispheric chamber wall 52 encloses a plasma expansion cone 63, connected at its narrow end to a conical mixing chamber 54, connected at its wide end to a hemispheric air space 56 receiving air injected at air inlet 57 connected to a source of compressed air, not shown. Compressed air enters air inlet 57 tangentially to the air space 56 and moves in a spiral shaped path indicated by arrows F, while it is preheated by contact with hemispheric wall 52 and enters the mixing chamber 54, wherein it is mixed with fuel entering from a fuel chamber 58 receiving fuel in either vaporized form from a fuel vaporizer 59 or in gaseous form from a gas fuel injector 61, as described in more detail below. Fuel from the fuel chamber 58 flows through apertures 62, enters the mixing chamber 54, from where the fuel-air mixture next enters a plasma expansion cone 63, and is ignited by an ignitor 65 connected to a spark generator not shown but similar to spark generator 42 in FIG. 1.

Protective heat linings 60 and 70 are deposited respectively on the inner surface of the hemispherical wall 52 and the plasma expansion cone 63. The heat shields are advantageously made of graphite, alumina or high temperature metallic alloys.

The air entering tangentially from air inlet 57 maintains its spiral motion as it travels through air space 56, mixing chamber 54 and as it expands, after ignition, through the expansion cone 63. The expanding burning gases form an imploding vortex as indicated by arrow G that spirals toward the symmetry plane 66, where it meets an oppositely rotating vortex forming in the opposite halfpart of the generator indicated by arrow G', wherein the two oppositely rotating air masses of hot gas plasma cause a separation of the electrical particles in the plasma. Due to the inherent instability of a mass of gas plasma system, electrical particles of opposite polarity drift to opposite sides of the vortex chamber 51. The two hemispheres 52, 52' made of conducting material receive the oppositely charged particles, so that their energy can be tapped off et respective electrical terminals 67, 67', connected to an electric energy converter as shown in FIG. 1.

Terminals 67, 67' are electrically insulated by means of insulators 80, 80' from the respective flanges 77 and 77' of the hemispheric walls 52, 52'.

It follows that in all cases wherein electric insulators are provided, the connecting bolts, e.g. bolts 79 in FIG. 4, which bridge the insulators must also be mounted in electric bolt insulators so as not to negate the insulating effect of the insulators. These bolt insulators are not shown in the figures in order to maintain clarity.

During operation, a sustained imploding vortex is maintained in each halfpart of vortex chamber 51. The imploding vortices indicated by arrows G and G' each move axially toward the symmetry plane 66, and continue rotating while expending to the perimeter of the hemispheric walls 52, 52', from where they return following the contour of the hemispheric walls as they move toward the respective mixing chambers 54, 54', from where part of the gases are drawn into the mixing chambers by the slanted vanes 68, 68', which draw part of the burning and rapidly rotating gases into the mixing chambers 54, 54', from where the gas particles re-enter the imploding vortices in a manner similar to the operation described above for the first embodiment. The exhaust gases leave the vortex chamber 51 through exhaust tubes 64, 64', as indicated by arrows H, H'.

An electrically insulating center separator 69 of a heat resistant electrically insulating material such as ceramic or alumina or the like is located at the center plane 66, and serves to electrically insulate the two hemispheres 52, 52' from each other to prevent short-circuiting the electrical power output.

A fuel vaporizer 59 also indicated in FIG. 1 serves to preheat and vaporize liquid fuel entering at fuel line 71 via a one-way valve 71a. Various forms of fuel vaporizers are shown and described in more detail below.

FIG. 5 is a view of the interior of the electric generator shown in FIG. 4, seen along the line 5—5 of FIG. 4, wherein the exhaust tube 64 is seen in the center, surrounded by apertures 62. The shaded area 63 shows the face of the plasma expansion cone 63. The circle 71 indicates the inner perimeter of a central opening in the center separator 69. The area between dashed line circles 72, 73 indicate the flange 74 by which the two hemispheres 52, 52' are joined by means of bolts or rivets 76 (FIG. 4). Beyond the air space 56 there is shown a flange 77 by which the hemispheric outer walls 78, 78' defining the air space 56, are joined by means of bolts or rivets 79.

Figure 13:
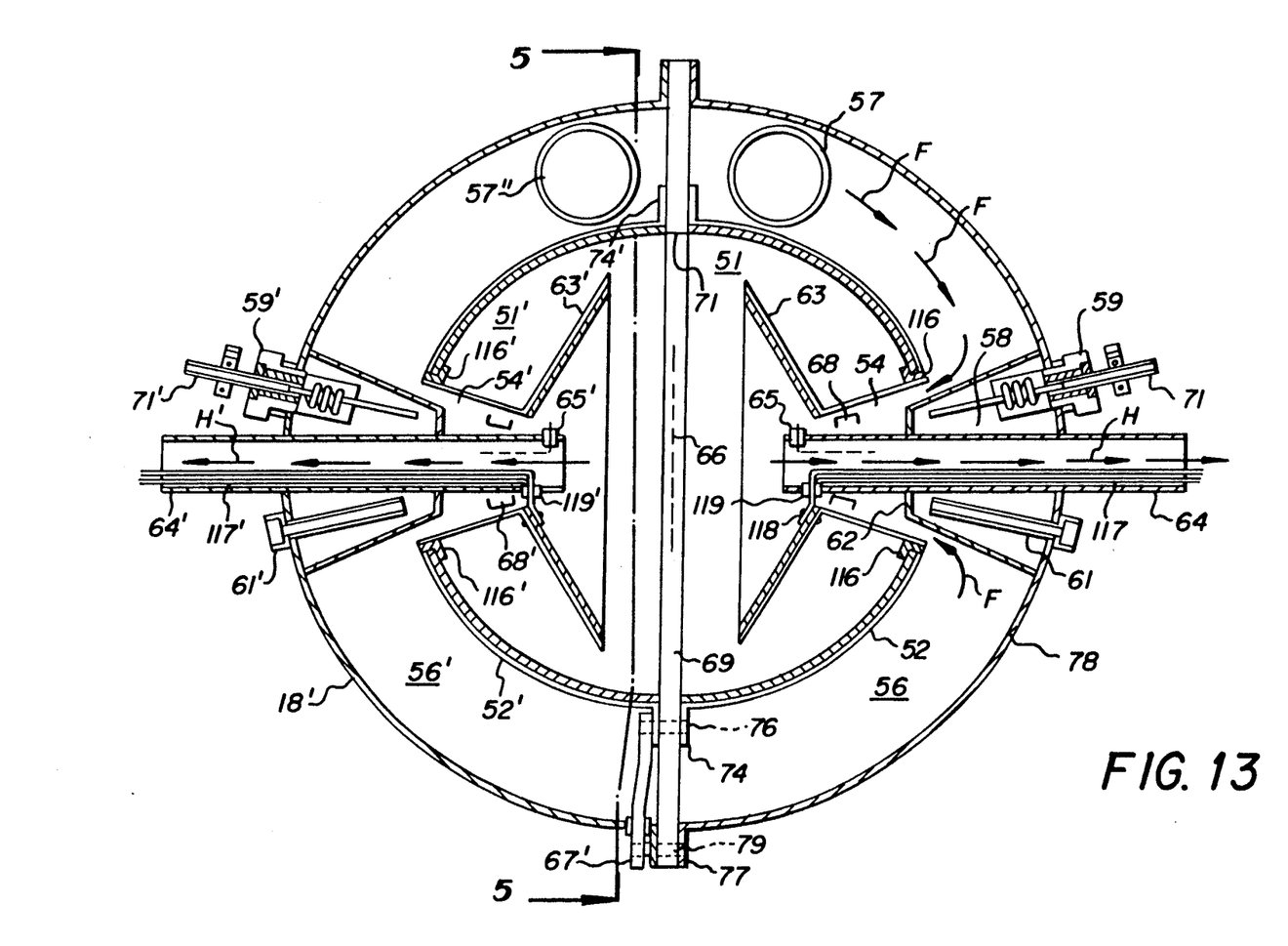

In a different mode of the invention according to FIG. 13, instead of setting the air masses in the two symmetrical halfparts 52, 52' in opposite rotation, the air masses can be set to rotate in the same direction simply by relocating the air inlet 57' to position 57'', where it is located juxtaposed to inlet 57. As a result, the electric charges caused by the parallel rotation of the plasma gas masses will cause oppositely electric charged particles to be deposited respectively on the inner structures formed by the expansion cones 63, 63' which will assume one polarity and the outer structures formed by hemispheric walls 52, 52' which will assume the opposite polarity.

It follows that in this embodiment the hemispheric walls 52, 52' are electrically connected together and to the electric terminal 67', while the inner structures composed of the expansion cones 63, 63' and the walls of the conical mixing chambers 54, 54', or other suitable inner structures, form the opposite pole insulated by means of circular electric insulators 116, 116'. Electric take-off means in the form of electric conductors 117 and 117' are connected via terminals 118, 118' to the expansion cones 63, 63' so that an electric potential difference is present between terminal 67' and the two conductors 117, 117'. The two conductors 117 and 117' are threaded through exhaust tubes 64, 64' through insulators 119, 119' in the wall of exhaust tubes 64, 64'.

Figure 6:
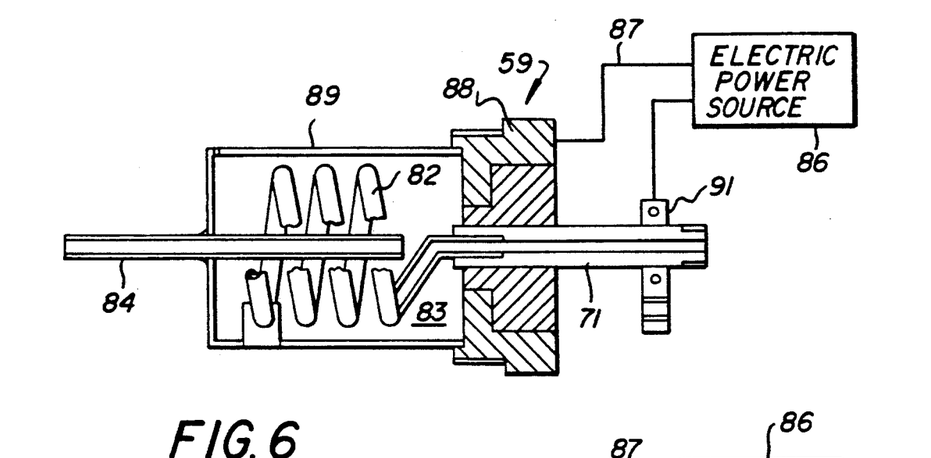
FIG. 6 is an elevational diagrammatic cross-sectional view of a heat exchanger for preheating fuel.
Figure 7:
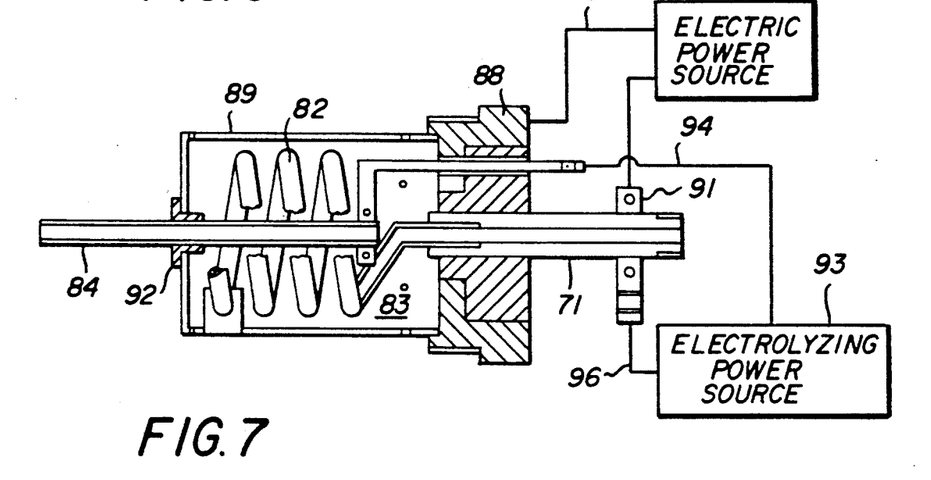
FIG. 7 is an elevational diagrammatic view showing a heat exchanger according to FIG. 6 with an electrolyzing electrode.
Figure 8:
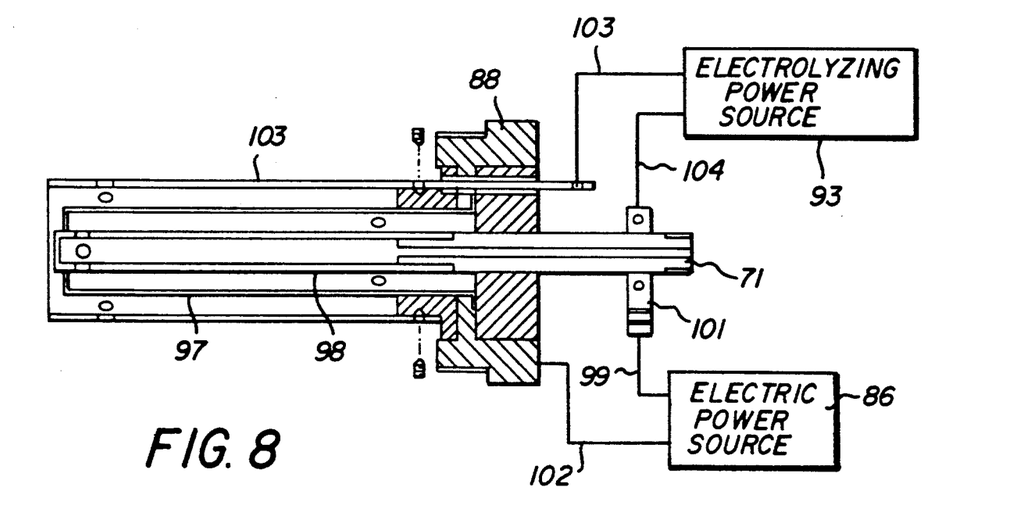
FIG. 8 is an elevational diagrammatic view showing a heat exchanger with an electrolyzing electrode and concentric tubular heating elements.

FIGS. 6, 7 and 8 show various forms of fuel vaporizers 59 which can be used in both embodiments of the invention to vaporize liquid fuel.

In FIG. 6, liquid fuel entering at fuel pipe 71 traverses a coiled tubular heating element 82, wherein it is vaporized and enters a vapor chamber 83' from where it exits through vapor tube 84. The heating element 82 is heated by current from an electric power source 86, connected thereto via conductor 87, a metallic body 88, the walls 89 of vapor chamber 83 and return path terminal 91.

FIG. 7 shows a vaporizer of similar construction as shown in FIG. 6, but having the vapor tube 84 insulated by an electric insulator 92 from the walls 89 of the vapor chamber 83, and having an electrolyzing power source 93 connected via conductors 94, 96 to the vaporizer for applying an electrolyzing potential to the vapor tube 84, so as to electrolyze fuel vapors issuing from vapor tube 84.

FIG. 8 shows a vaporizer having a heating element composed of series-connected concentric tubular elements 97, 98 made of resistive electric material heated by electric power source 86 via conductor 99, terminal 101, fuel pipe 71, conducting body 88 and return conductor 102. An outer tubular electrolyzing element 103 is connected to an electrolyzing power source 93 via conductor 103. The electrolyzing power source 93 is connected to electric power source 86 via conductor 104 and terminal 101.

Figure 9:
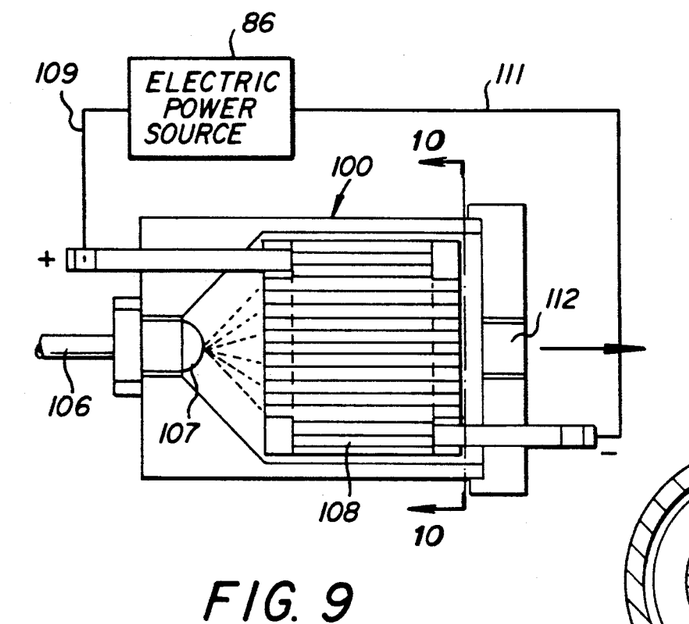
FIG. 9 is an elevational diagrammatic cross-sectional view showing a heat exchanger with a reticulated core.
Figure 10:
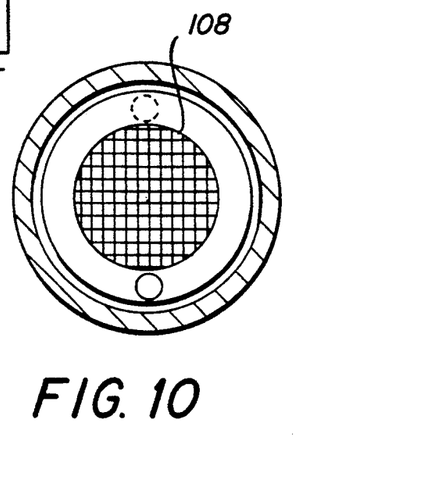
FIG. 10 is an elevational diagrammatic cross-sectional view seen along the line 10—10 of FIG. 9.

FIGS. 9 and 10 show a fuel vaporizer for vaporizing large fuel flows, having a liquid fuel inlet line 106 connected to fuel dispersing spray nozzle 107 which sprays fuel into a reticulated metal heating element 108 having a honey-combed cross-section as shown in FIG. 10, and which is heated by electric current supplied by an electric power source 86 via conductors 109, 111. The fuel is vaporized in heating element 108 and exits at fuel vapor outlet 112. The heating elements 108 and 113 are supported within electrically insulating containing structures indicated by respective reference numerals 100 and 105 so as to avoid short circuiting the heating elements.

Figure 11:
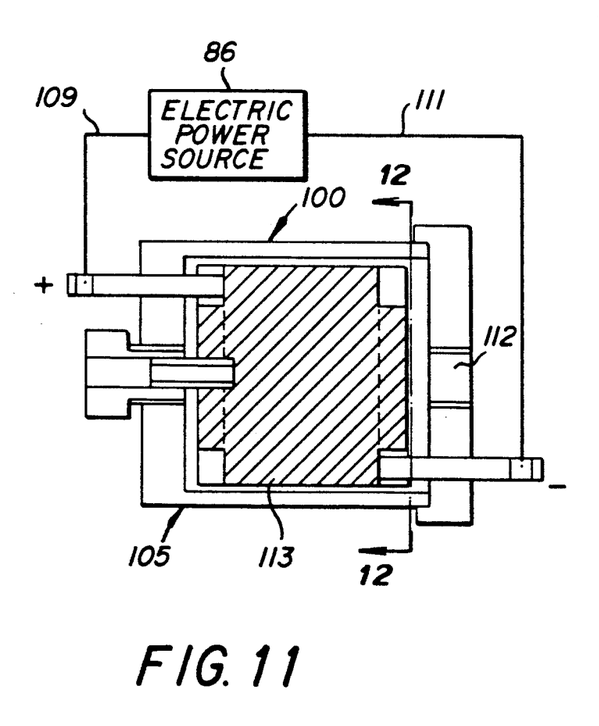
FIG. 11 is an elevational diagrammatic cross-sectional view showing a heat exchanger with a porous core.
Figure 12:
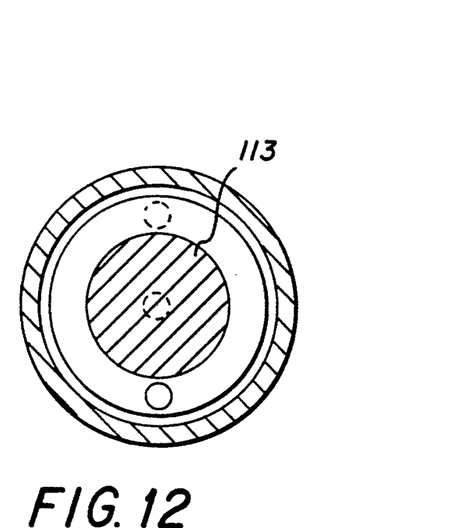
FIG. 12 is an elevational diagrammatic cross-sectional view showing the heat exchanger according to FIG. 11, seen along the line 12—12 of FIG. 11.

FIGS. 11 and 12 show a vaporizer of similar construction as in FIGS. 9 and 10, but having a heating element 113 made of porous metal instead of a honey-combed heating body as in FIG. 9.

The internal metallic surfaces of the vaporizers shown in FIGS. 6, 7, 8, 9 and 11 may be coated with a catalyzing element, which enhances the catalyzation of the fuel vapors, such as elements platinum, paladium, nickel or the like.

I claim:

1. An electric generator using imploding plasma dynamics for generating electric energy from fuel energy, comprising:
   (a) two facing hemispheric vortex chambers having a common axis;
   (b) an electric insulator separating said vortex chambers, disposed in a plane perpendicular to said common axis;
   (c) two facing hemispheric shrouds each enclosing a respective one of said hemispheric vortex chambers, and forming respective air spaces with said vortex chambers;
   (d) two oppositely oriented air inlets for injecting air in opposite directions into said air spaces;
   (e) air compressor means fluidly communicating with said air inlets for injecting compressed air into said air inlets;
   (f) respective fuel-air mixture injection means in said hemispheric vortex chambers, each fuel-air mixture injection means including a mixing chamber in fluid communication with a respective air space, a plasma expansion cone fluidly communicating with a respective mixing chamber, ignition means in said plasma expansion cones for igniting said fuel-air mixture, and forming oppositely rotating imploding plasma vortices in said vortex chambers; and
   (g) electric energy take-off means for taking off electric energy generated by said oppositely rotating imploding plasma vortices.

2. An electric generator according to claim 1, including fuel preheating means having a preheated fuel outlet in fluid communication with said fuel line, and a fuel inlet for receiving liquid and/or gaseous fuel.

3. An electric generator according to claim 2, including a heat exchanger in said fuel preheating means, said heat exchanger including a heating element, an electric power source connected to said heating element for electrically heating said heating element, and a fuel channel in said heating element for circulating fuel to be heated in said channel, said channel having a heated fuel outlet in fluid communication with said preheated fuel outlet.

4. An electric generator according to claim 3, wherein said heating element is a coiled tube.

5. An electric generator according to claim 4 including en electrolyzing electrode in said heat exchanger for electrolyzing said heated fuel, and an electrolyzing power source connected to said electrolyzing electrode for electrolyzing said heated fuel.

6. An electric generator according to claim 1, including means for injecting a catalyzing agent in said fuel-air mixture injection means.

7. An electric generator according to claim 1, wherein said vortex chamber has an inner surface, at least part of said inner suface including a layer of a catalyzing agent, said catalyzing agent comprising at least one of the group of materials including palladium, platinum, nickel, iron, cobalt and titanium.

8. An electric generator according to claim 1, wherein a heat protective lining is made of an electrically conducting material.

9. An electric generator using imploding plasma dynamics for generating electric energy from fuel energy, comprising:
(a) two facing hemispheric vortex chambers having a common axis;
(b) two facing hemispheric shrouds each enclosing a respective one of said hemispheric vortex chambers, and forming respective air spaces with said vortex chambers;
(c) two parallel juxtaposed air inlets for injecting air in the same direction into said air spaces;
(d) air compressor means fluidly communicating with said air inlets for injecting compressed air into said parallel air inlets;
(e) inner structures including respective fuel-air mixture injection means in said hemispheric vortex chambers, each fuel-air mixture injection means including a mixing chamber in fluid communication with a respective air space, a plasma expansion cone fluidly communicating with a respective mixing chamber, ignition means in said plasma expansion cones for igniting said fuel air mixture, and forming parallel rotating imploding plasma vortices in said vortex chambers;
(f) electric insulating means for insulating said hemispheric vortex chambers from said inner structures; and
(g) electric energy take-off means for taking off electric energy generated by said rotating imploding plasma vortices.

* * * * *